United States Patent [19]

Garcia et al.

[11] Patent Number: 5,037,580
[45] Date of Patent: Aug. 6, 1991

[54] ENDOTHERMIC BLOWING AGENTS FOR STRENGTHENING WELD LINES IN MOLDED THERMOPLASTIC RESINS AND PRODUCTS

[75] Inventors: Rod A. Garcia, Orange, Tex.; John A. Kosin, Bel Air, Md.; Gerry Mooney, West Ajax, Canada; Michael E. Tarquini, Havre de Grace, Md.

[73] Assignee: J. M. Huber Corporation, Rumson, N.J.

[21] Appl. No.: 467,587

[22] Filed: Jan. 19, 1990

Related U.S. Application Data

[63] Continuation-in-part of Ser. No. 352,307, May 16, 1989.

[51] Int. Cl.⁵ .................................................. C09K 3/00
[52] U.S. Cl. .............................. 252/350; 252/183.12; 521/57; 521/76; 521/92
[58] Field of Search .................... 252/350, 183.12; 521/57, 76, 92

[56] References Cited

U.S. PATENT DOCUMENTS

| | | |
|---|---|---|
| Re. 26,278 | 10/1967 | Pottenger ............................ 521/98 |
| 2,008,489 | 7/1935 | Cousins . |
| 2,832,744 | 5/1958 | Soule et al. . |
| 2,912,379 | 11/1959 | McCracken et al. . |
| 3,055,846 | 9/1962 | Flack et al. . |
| 3,350,306 | 10/1967 | Alletou . |
| 3,645,931 | 2/1972 | Normanton . |
| 3,979,318 | 9/1976 | Tokiwa et al. . |
| 4,156,039 | 5/1979 | Klebe et al. . |
| 4,218,511 | 8/1980 | Hahn et al. . |
| 4,456,572 | 6/1984 | Eguchi et al. ....................... 521/79 |
| 4,522,955 | 6/1985 | Fukashima et al. .................. 521/79 |
| 4,614,648 | 9/1986 | Bru . |
| 4,623,478 | 11/1986 | Pastorino . |
| 4,632,942 | 12/1986 | Ito et al. ............................... 521/92 |
| 4,638,015 | 1/1987 | Bertrand ............................... 521/79 |

Primary Examiner—Morton Foelak
Attorney, Agent, or Firm—Harold H. Flanders; Alec H. Horn; Robert L. Price

[57] ABSTRACT

Compositions for producing foamed products which include filler and/or pigment additives and blowing agents which enhance the strength of weld lines which are produced when the compositions are molded. The products produced from the compositions have weld line that demonstrate superior strengths as compared to similar foamed products which do not utilize the particular blowing agents.

8 Claims, No Drawings

ENDOTHERMIC BLOWING AGENTS FOR STRENGTHENING WELD LINES IN MOLDED THERMOPLASTIC RESINS AND PRODUCTS

RELATED APPLICATIONS

This application is a continuation-in-part of U.S. Patent Application Ser. No. 07/352,307, filed May 16, 1989.

TECHNICAL FIELD

The present invention relates to endothermic blowing agents for use in making foamed products such as cellular structured plastics or rubbers. In particular, the present invention relates to endothermic blowing agents which are used in conjunction with pigments and/or fillers to strengthen weld lines in molded foam products.

BACKGROUND ART

The term "foaming agent" or "blowing agent" is used to describe any substance which alone or in combination with other substances is capable of producing a cellular structure in a plastic or rubber mass. Thus, the term includes gases which expand when pressure is released, soluble solids that leave pores when leached out, liquids which develop cells when they change to gases, and chemical agents that decompose or react under the influence of heat to form a gas.

Known liquid foaming agents include certain aliphatic and halogenated hydrocarbons, low boiling alcohol, ethers, ketones, and aromatic hydrocarbons. Chemical foaming agents range from simple salts such as ammonium or sodium bicarbonate to complex nitrogen releasing agents, of which azobisformamide is an important example.

Foaming agents, also known as chemical blowing agents (CBA's) can be utilized in all conventional plastics processes, such as extrusion, calendering, injection molding, coating, expansion casting, and rotational molding.

Recognized advantages of foamed plastics include reduction in density, savings in material costs, improved electrical and thermal insulative properties, increased strength to weight ratio, and the elimination of shrinkage, warpage, and sink marks in injection molded parts. Foamed plastic products include such diverse items as vinyl flooring, insulated food containers, structural foam furniture, business machine housings, simulated leather, and foamed core pipe.

Foaming agents are generally classified as physical or chemical. Chemical foaming agents (generally solids) undergo a chemical transformation when producing gas, while physical foaming agents undergo a generally reversible physical change of state, e.g., vaporization.

The two major categories of physical foaming agents include both liquids and gases. The gas most often is compressed nitrogen. In injection molding processes which utilize physical foaming agents, the gas is injected under high pressure directly into the polymer during plastication, and the mixed polymer and gas are metered into the mold. When the pressure is relieved, the gas becomes less soluble in the polymer and expands, forming the cellular structure. Nucleating agents, in the form of finely divided powders and chemical foaming agents, sometimes are used with the gas to yield a finer cell structure.

The preference for nitrogen is due to the fact that nitrogen is inert, nonflammable, leaves no residue in the polymer, and is not temperature restrictive. However, the use of processes involving nitrogen is limited in the industry due to the requirement of licensed specialized equipment. Moreover, the process tends to produce foams with poorer performance and appearance than those produced by the use of exothermic chemical blowing compounds.

Liquid physical foaming agents include volatile liquids which produce gas through vaporization. Common liquid physical foaming agents generally include short-chain aliphatic hydrocarbons ($C_5$ to $C_7$) and their chlorinated and fluorinated analogs. Liquid physical foaming agents may be used over a wide temperature range in low pressure and atmospheric processes, and are widely used to produce low density thermoplastics, such as foamed polystyrene, and thermoset polymers, such as polyesters, epoxy, and polyurethane foam systems.

Chemical foaming agents commonly referred to as blowing agents are generally solids that liberate gas(es) by means of a chemical reaction or decomposition when heated. They are necessarily selected for specific applications or processes based on their decomposition temperatures. In this regard, it is important to match the decomposition temperature with the processing temperature of the polymer to be foamed. If the polymer processes at temperatures below that of the chemical foaming agent, little or no foaming will occur. If the process temperature is significantly above the foaming agent's decomposition temperature, poor (overblown, ruptured) cell structure and surface skin quality will likely result.

Chemical foaming or blowing agents may be either inorganic or organic. The most common inorganic foaming agent is sodium bicarbonate. Sodium bicarbonate is inexpensive, nonflammable and begins to decompose at a low temperature; however, it is used only to a very limited extent in thermoplastics. Differential thermal analysis has shown that sodium bicarbonate decomposes over a broad temperature range and this range is endothermic, contributes to an open cell structure in the finished product, and the released gas (carbon dioxide) diffuses through the polymer at a much greater rate than nitrogen gas.

Presently used chemical foaming or blowing agents are mostly mixtures of sodium bicarbonate and sodium hydrogen citrate. The citrate is incorporated together with the sodium bicarbonate in order to facilitate a complete acid assisted decomposition reaction to produce carbon dioxide gas. The mixture is also available in a variety of polymer concentrates at various loadings. The mixture is also available as a hydrophobized acid and carbonate which is a free flowing non-dusting powder.

The major advantages associated with utilizing endothermic foaming or blowing agents over their exothermic counterparts include short degassing cycles, small cells, smooth surfaces, weight reductions, reduced cycle times, foamed products which have promptly paintable surfaces, the foaming process is odorless, and the components of the foaming agents are generally regarded as environmentally safe.

The major disadvantage of existing acid/carbonate systems involves the formation of corrosion on the process equipment. This corrosion is attributed to the action of the citric acid and sodium bicarbonate on the lesser grades of steel used in some equipment. Another disadvantage associated with existing acid/carbonate blowing agents is premature reaction with water or moisture of the blowing agents when they are associated with polymeric reaction mixtures. This premature reaction when occurring prior to a foaming process detrimentally effects the final products.

Organic foaming or blowing agents can be utilized in most polymer applications and processes. These compounds release gas (usually nitrogen and/or ammonia) over a narrow temperature range. The rate of gas evolution for a given chemical foaming or blowing agent is determined by a temperature and time relationship. Applications for chemical foaming agents are generally divided into three areas: low, medium and high temperature processing polymers. There are numerous organic foaming agents available that decompose at various temperatures.

Foamed products are produced by a number of molding processes including injection molding, blow molding, rotational molding, and the like. In these molding processes weld lines (also known as knit or flow lines) are produced whenever two melt fronts collide, i.e., whenever two streams of molten plastic meet and cool in a mold. These resulting weld lines form areas which have different mechanical properties thereby creating structural problems in the foam product industry.

It has been discovered that fillers and/or pigments, especially platelet and/or fillers, e.g., mica and talc, create very weak weld lines in either injection or blow molding processes. N. Burditt et al, "The Knit-line Strength of Mica-filled Polypropylene", *Plastics Compounding*, March/April 1985, pp. 62–66, discusses knit-line problems involving two surface treated phlogopite micas. Knit-line strength problems were found to be due to a combination of flake orientation and delamination.

M. Christie, "Toughening Weld Lines of Micareinforced PP Parts", *Plastics Engineering*, July 1986, pp. 41–43 and G. Brewer, "A Technique for Strengthening Weldlines in Thermoplastic Parts", ANTEC, pp. 252–254 (1987) both discuss proposed methods for strengthening weld lines in molded foam products. These proposed methods include the use of coupling agents, reducing flake size and thickness of fillers, annealing welded parts, mechanical milling of weld lines and solvent treatments to relieve mixing orientation.

It is necessary to include fillers and/or pigments such as mica and talc in foamed products in order to enhance physical properties of foamed products Therefore, a great need exists in the foamed product industry for a procedure or process by which foamed products containing pigments and/or fillers having strong weld lines can be produced.

The present invention provides such a process by which foamed products containing pigments and/or fillers can be molded with strong weld lines.

The present invention further provides for endothermic foaming or blowing agents which are highly stable and which do not prematurely react with water or moisture.

DISCLOSURE OF THE INVENTION

It is accordingly one object of the present invention to provide a method for producing molded foam products having strong weld lines.

A further object of the present invention is to provide a method for producing molded foam products containing pigments and/or fillers which have strong weld lines.

Another object of the present invention is to provide a method for producing molded foam products having strong weld lines which are produced from a composition that includes a novel endothermic blowing agent and pigment and/or filler additives.

A still further object of the present invention is to provide for molded foamed products which have strong weld lines.

A still further object of the present invention is to provide for molded foamed products containing pigments and/or fillers which have strong weld lines.

According to the above objectives, there is provided by the present invention an endothermic blowing agent which include a polycarboxylic acid and an inorganic carbonate, each of which has been surface treated with a compound which prevents premature reaction due to water absorption.

Also provided by the present invention is a method to produce the above endothermic blowing agents and for foamed products having strong weld lines which products are produced by processes that utilize the endothermic blowing agents. These foamed products contain various pigments and/or fillers whose adverse structural effect on weld lines is reduced by incorporation of the novel blowing agents.

BEST MODE FOR CARRYING OUT THE INVENTION

The method of producing molded foam products according to the present invention involves molding a resinous composition which includes a polymer resin, pigment and/or filler additives, and an endothermic blowing agent. The molding process may be any molding process which results in weld lines, and preferably involves injection molding, blow molding and rotational molding.

Any conventional pigment and/or filler additives utilized in polymeric foamed products to provide for structural strength, chemical inertness, fire proofing, brightness, and the like may be utilized, including quartz, mineral wool, fullers earth, alumina silicates, silicon dioxide, kaolinite, bentonite, mica, talc, and the like. However, the present method is especially suitable for use with platelet pigments and/or fillers such as talc, mica and calcium aluminum hydroxide.

The present invention can be utilized to improve weld line strength in a variety of foamed materials including polyvinyl chloride, polyolefins, engineering resins, polystyrene, polyphenylene oxide, and other polymeric systems. Particular advantages have been discovered in utilizing polyethylene and polypropylene.

The powdered endothermic blowing agents used in the present invention are produced by blending a surface treated polycarboxylic acid and a surface treated inorganic carbonate. The surface treatment of these materials can be performed in a high intensity mixture at a temperature range of between about 72° C. and about 135° C., with a preferred temperature being about 80° C. The preferred level of surface treatment is from about 0.1% to about 10%, and most preferably about 3% for the polycarboxylic acid and about 3% for the inorganic carbonate. The formation of the surface treatment within this preferred range has been found to be effective in avoiding premature reaction resulting from water absorption.

In surface treating the polycarboxylic acid, a typical laboratory batch is prepared by adding about 1500 grams of polycarboxylic acid, e.g., anhydrous citric acid to a 10 liter Henschel mixer or other suitable high intensity mixer. The polycarboxylic acid is mixed at about 1500 rpm and heated until a temperature of about 80° C. is reached. Any heating means such as hot water flowing through a water jacket surrounding the mixer may be used to attain the desired temperature. After reaching the desired temperature about 45.0 grams of a surface treating compound such as glyceryl monostearate is added to the heated polycarboxylic acid and mixing is continued at about 1500 rpm and about 80° C. for an additional period of time of approximately five minutes. After five minutes the mixing speed is reduced to about 900 rpm and the mixture is allowed to cool below about 60° C. Thereafter the surface treatment of the polycarboxylic acid is complete and the mixture is unloaded.

In surface treating the inorganic carbonate, about 3500 grams of an inorganic carbonate, e.g., dry sodium aluminum hydroxy carbonate, is charged into a 10 liter Henschel mixer. The inorganic carbonate is mixed at a speed of about 1500 rpm and heated by a suitable means such as a hot water jacket until a temperature of about 80° C. is reached. After reaching the proper temperature about 105.0 grams of a surface treating compound such as glyceryl monostearate, is added to the inorganic carbonate and mixing is resumed at about 1500 rpm for about five minutes while the temperature is maintained at about 80° C. After the required mixing, the mixing speed is reduced to about 900 rpm and the mixture is allowed to cool below about 60° C. Thereafter, the inorganic carbonate has been sufficiently surface treated and may be unloaded from the mixer.

In preparing a large scale batch of the above surface treated components, about 200 pounds of polycarboxylic acid, e.g. citric acid, was charged into a 200 liter Henschel mixer. The polycarboxylic acid was mixed until the temperature of about 68° C. was reached. In this case neither steam nor hot water was needed to raise the temperature. When the polycarboxylic acid reached a temperature of about 68° C. six pounds of a surface treating component, e.g., glyceryl monostearate, was added to the mixer. Mixing continued until a temperature of about 72° C. was reached, after which mixing was continued for an additional period of time of about 5 minutes. Thereafter the mixture was allowed to cool to below about 60° C. and was unloaded from the mixer. The batch surface treatment procedure was repeated for the inorganic carbonate using about 150 pounds of dry inorganic carbonate, e.g., sodium aluminum hydroxy carbonate, and about 4.5 pounds of the surface treating component, e.g., glyceryl monostearate.

The present endothermic blowing agents are prepared by blending together the surface treated polycarboxylic acid and the surface treated inorganic carbonate. In a preferred embodiment about 1250 grams of surface treated inorganic carbonate, e.g., sodium aluminum hydroxy carbonate, was placed into a 10 liter Henschel mixer together with about 1250 grams of surface treated polycarboxylic acid, e.g., citric acid. The mixture was mixed at about 1500 rpm for a period of time of about five minutes. Thereafter, the mixing speed was reduced to about 900 rpm for a short period of time and unloaded from the mixture. The polycarboxylic acid and the inorganic carbonate may be surface treated at the same time.

In the above discussion, the preferred polycarboxylic acid used was citric acid. However, for purposes of the present invention, other suitable carboxylic acids include those of the formula: HOOC-R-COOH where R is an alkylene group of 1 to about 25 carbon atoms which may also be substituted by one or more hydroxy groups or keto groups and may also contain unsaturation. Also included are salts and half salts. Preferred polycarboxylic acids include citric acid, fumaric acid, tartaric acid, sodium hydrogen citrate and disodium citrate.

The preferred inorganic carbonate utilized in the invention is sodium aluminum hydroxy carbonate. However, acceptable results are also achieved by also using sodium bicarbonate as well as alkali and alkaline earth metal carbonates generally.

In the above examples glyceryl monostearate was utilized as the preferred surface treatment compound. However, surface treatment can be carried out utilizing any reagent which renders the polycarboxylic acid and the inorganic carbonate hydrophobic. In this regard, suitable surface treating components found useful for purposes of the present invention included various monoglycerides, stearic acid, silane coupling agents, fatty acids, and titanates in addition to the above glyceryl monostearate.

In combining the surface treated polycarboxylic acid and the surface treated inorganic carbonate to produce the blowing agent the weight ratio of these two components needs to be determined based on the desired structure and composition of the final foam produce to be produced. Typically, the weight ratio of surface treated polycarboxylic acid to surface treated inorganic carbonate may vary from about 0.25 to about 10.00. However, the weight ratio is preferably maintained between about 0.5 and about 1.5.

The endothermic blowing agent is preferably used by incorporating it into a polymeric concentrate which is used to produce foam products. In one embodiment according to the present invention the polymeric or plastic concentrates were prepared at loading levels of from about 5% to about 80% in a single or twin screw extruder utilizing normal techniques known to those schooled in the art of plastic compounding. The extruder must, however, be operated below about 149° C. in order to keep the endothermic blowing agent from foaming prematurely.

In these polymeric or plastic concentrates citric acid may be replaced by other polycarboxylic acids such as fumaric acid, tartaric acid and sodium hydrogen citrate which have higher melt temperatures and will allow higher extrusion temperatures. The novel interaction between the polycarboxylic acid and the inorganic carbonate controls the composition and the volume of the above gases which serve to foam a plastic for foamed products.

The application areas for these endothermic products include polyvinyl chloride, polyolefins, engineering resins, polystyrene, polyphenylene oxide and other polymeric systems. As noted above, preferred polymeric systems in which superior weld lines are produced include polyethylene and polypropylene. Foamed products produced by utilizing the above endothermic agents display excellent weight reduction and drop weight impact properties.

The blowing agents of the present invention have been found to unexpectedly enhance the weld line strength in a variety of thermoplastic compositions containing pigments and/or fillers, particularly platelet pigments and/or fillers, such as mica and talc.

In utilizing the above endothermic blowing agents to enhance weld line strength or to produce molded products having superior weld lines, the blowing agents are incorporated into polymeric or plastic concentration together with pigments and/or fillers, such as mica or talc. The resulting reaction mixture is subjected to a molding process that involves the formation of weld lines. These resulting weld lines, as discussed further below, demonstrate physical strengths which are superior to those of similarly molded products which do not include the blowing agents.

As described in detail above, the present invention involves an endothermic blowing agent which is a mixture of a polycarboxylic acid and an inorganic carbonate, wherein the polycarboxylic acid and the inorganic carbonate each have been surface treated with a component that prevents water from being absorbed thereby.

When properly surface treated, the level of surface treatment of the polycarboxylic acid and the inorganic carbonate is between about 1.0 and 5.0 percent by weight. In a preferred embodiment the level of surface treatment of said polycarboxylic acid is about 3.0 percent by weight and the level of surface treatment of said inorganic carbonate is about 3.0 percent by weight.

The ratio of the polycarboxylic acid and the inorganic carbonate may vary over a wide range and will be determined by the final desired products. Generally, the weight ratio of the surface treated polycarboxylic acid to the surface treated inorganic carbonate is between about 0.25 and about 10.00, with a more desired weight ratio being between about 0.5 and about 1.5.

As further discussed in detail above, the present endothermic blowing agents are made by a particular method. Generally, this method involves the steps of:

(a) heating a dry powder of polycarboxylic acid to a temperature of between about 68° C. and about 80° C. and adding thereto a surface treating component to form a surface treated polycarboxylic acid;

(b) heating a dry powder of an inorganic carbonate to a temperature of between about 68° C. and about 80° C. and adding thereto a surface treating agent to form a surface treated inorganic carbonate and;

(c) mixing together the surface treated polycarboxylic acid and the surface treated inorganic carbonate to form the endothermic blowing agent.

In this method, each of the steps is preformed in a high intensity mixer in which the components are agitated.

The endothermic blowing agent is ideally incorporated into a polymeric concentrate that is used for producing foamed products. The polymeric concentrate includes both the endothermic blowing agent and a polymer reaction mixture. Particular polymer reaction mixtures are those that may be used to produce polymers of polyvinyl chloride, polyolefins, engineering resins, and polystyrene.

The above endothermic blowing agents are preferably utilized in combination with polymer reaction mixtures which contain pigments and/or fillers. Foamed products formed from these reaction mixtures have been found to have weld lines which exhibit superior strengths.

Finally, the present invention involves molded foamed polymeric products that have been produced by utilizing the above blowing agents in combination with polymer reaction mixtures that contain fillers and/or pigments.

The following examples are presented to illustrate the invention which is not intended to be considered as being limited thereto. In the examples and throughout percentages are by weight unless otherwise indicated.

EXAMPLE 1

In order to initially investigate the effect of the above endothermic blowing agent on weld line strength, a pump housing was molded from a polyethylene reaction mixture that included 25 weight percent mica and 0.6 weight percent of an endothermic blowing agent which include a polycarboxylic acid and an inorganic carbonate. The tensile strength of the resulting weld lines were measured. The results of these tests are given in Table I below.

TABLE I

| Sample | Additive | Weld Line | Tensile Strength (PSI) | Percent Elongation |
|---|---|---|---|---|
| A | No CBA | YES | 2,913 | 1.30 |
| B | No CBA | NO | 3,625 | 12.92 |
| C | CBA | YES | 3,496 | .73 |
| D | CBA | NO | 3,964 | 6.77 |

In these tests the samples did not break at the weld lines. From this data it was concluded that the endothermic blowing agents enhanced the weld line strength of the mica-filled polyethylene compounds.

EXAMPLE 2

In this example, injection molded samples having weld lines were produced from a reaction mixture containing 79 weight percent ethylene-vinyl acetate, 20 weight percent of an endothermic blowing agent which include a surface treated polycarboxylic acid and an inorganic carbonate, and 1 weight percent mica.

The molding operation was conducted utilizing a Toshiba Injection Molding Machine, Model LSE 120N. The molding parameters included an injection time of 13 seconds, a hold time of 20 seconds and a closed mold time of 5.0 seconds.

The resulting samples were tested and found to have the tensile properties listed in Table II below.

TABLE II

| Sample | Tensile Modulus PSI | Tensile Strength PSI | % Elong at Break | Tensile Strength Break, PSI |
|---|---|---|---|---|
| 1 | 94,940 | 1206 | 1.94 | 1027 |
| 2 | 101,600 | 1312 | 2.40 | 1048 |
| control | 136,100 | 1406 | 1.83 | 776 |

From the above data, the tensile properties at break indicate a significant improvement in weld line strength, as expected.

Although the invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

We claim:

1. A composition for producing a molded foamed product having superior weld line strength which comprises at least one polymer component, an additive selected from the group consisting of fillers, pigments and combinations thereof, and a blowing agent which enhances the strength of weld lines which are produced when said composition is molded, said blowing agent comprising a mixture of a polycarboxylic acid and an inorganic carbonate, wherein said polycarboxylic acid and said inorganic carbonate have been surface treated with a component selected from the group consisting of mono-glycerides, stearic acid, silane coupling agents, fatty acids, titanates, oleates and mixtures thereof.

2. A composition for producing a molded foamed product according to claim 1, wherein said polycarboxylic acid is selected from the group consisting of those of the formula HOOC-R-COOH and alkali metal salts thereof, wherein R is alkylene of 1 to 25 carbon atoms which may contain one or more hydroxy substituents and may also contain unsaturation.

3. A composition for producing a molded foamed product according to claim 2, wherein said polycarboxylic acid is selected from the group consisting of citric acid, fumaric acid, tartaric acid, sodium hydrogen citrate, monosodium citrate, and mixtures thereof.

4. A composition for producing a molded foamed product according to claim 1, wherein said inorganic carbonate is an alkali metal or alkaline earth metal carbonate.

5. A composition for producing a molded foamed product according to claim 1, wherein said inorganic carbonate is selected from the group consisting of sodium aluminum hydroxy carbonate, sodium bicarbonate and mixtures thereof, and said polycarboxylic acid is citric acid.

6. A composition for producing a molded foamed product according to claim 1, wherein said surface treating component comprises glyceryl monostearate.

7. A composition for producing a molded foamed product according to claim 1, wherein said additive has a platelet shape.

8. A composition for producing a molded foamed product according to claim 1, wherein said additive is selected from the group consisting of mica, talc and mixtures thereof.

* * * * *